(12) United States Patent
Lemelson et al.

(10) Patent No.: US 6,816,158 B1
(45) Date of Patent: Nov. 9, 2004

(54) THREE-DIMENSIONAL DISPLAY SYSTEM

(76) Inventors: Jerome H. Lemelson, deceased, late of Incline Village, NV (US); by Dorothy Lemelson, legal representative, Unit 802, Suite 286, 930 Tahoe Blvd., Incline Village, NV (US) 89451; Robert D. Pedersen, 7808 Glenneagle, Dallas, TX (US) 75248; Tracy D. Blake, 985 N. Granite Reef Rd. Unit 139, Scottsdale, AZ (US) 85257

( * ) Notice: Subject to any disclaimer, the term of this patent is extended or adjusted under 35 U.S.C. 154(b) by 0 days.

(21) Appl. No.: 09/183,191

(22) Filed: Oct. 30, 1998

(51) Int. Cl.$^7$ .............................................. G06T 15/00
(52) U.S. Cl. ........................................ 345/419; 348/48
(58) Field of Search ................................ 345/419, 418, 345/427

(56) References Cited

U.S. PATENT DOCUMENTS

| | | | |
|---|---|---|---|
| 1,772,782 A | 8/1930 | Noaillon | |
| 3,178,720 A | 4/1965 | Collender | 352/38 |
| 3,825,328 A | 7/1974 | Hoch | 352/60 |
| 3,894,347 A | 7/1975 | Sleven et al. | 35/10.4 |
| 3,896,487 A | 7/1975 | Tesler | 358/3 |
| 4,122,484 A | 10/1978 | Tan | 358/3 |
| 4,151,549 A | 4/1979 | Bautze | 358/3 |
| 4,164,748 A | 8/1979 | Nagata | 358/3 |
| 4,214,257 A | 7/1980 | Yamauchi | 358/3 |
| 4,217,602 A | 8/1980 | Thomas et al. | 358/3 |
| 4,236,172 A | 11/1980 | Krasnoperov | 358/3 |
| 4,266,240 A | 5/1981 | Levy | 358/3 |
| 4,287,528 A | 9/1981 | Levy | 358/3 |
| 4,290,083 A | 9/1981 | Collender | 358/88 |

(List continued on next page.)

OTHER PUBLICATIONS

Hutson, Geoffrey H., "*Colour Television Theory—PAL–System Principles and Receiver Circuitry*", McGraw–Hill (1971).

Spreadbury, E. A. W., "*Television Explained*" ($8^{th}$ edition), London/Life Books Ltd., 1968.

Ennes, Harold E., "*Television Broadcasting—Equipment, Systems, and Operating Fundamentals*" ($2^{nd}$ edition), Howard W. Sams & Co., Inc. (1979).

(List continued on next page.)

*Primary Examiner*—Don Wong
*Assistant Examiner*—Huedung X. Cao
(74) *Attorney, Agent, or Firm*—Edwin A. Suominen; Douglas W. Rudy

(57) ABSTRACT

A system and method for generating and displaying three-dimensional images of a scene 6 on a screen 12 that provides multiple viewing positions for one or more viewers 16. A stereoscopic video capture system 2 and 4 picks up video images 3 and 5 of the scene 6. A video signal processing unit processes the video images into video signals. The video signal processing unit has a graphics controller 8 for controlling and processing the video signals into stereoscopic display signals. A display unit 10 displays the stereoscopic display signals as stereoscopic display images on the screen 12, and the graphics controller 8 manipulates the stereoscopic display images to provide multiple viewing positions of the stereoscopic display signals on the display unit 10 of the screen 12 to the one or more viewers 16. Multiple viewing angles and distances are provided for the one or more viewers 16. The stereoscopic display images are oscillated to provide multiple viewing angles. The stereoscopic display images comprise vertical image pair strips 32 and 34 and dark vertical strips 49 interposed between the vertical image pair strips 32 and 34. These strips 32 and 34 and strips 49 are alternately interchanged in position for oscillating the stereoscopic display images, typically above a critical fusion frequency for human vision, to provide multiple viewing angles. The vertical image pair strips 32 and 34 are varied in width to provide multiple viewing distances. A control unit, such as a remote unit 200 or 210 or attached unit, is used for adjusting the multiple viewing positions of the stereoscopic display images on the screen 12 for the one or more viewers 16.

30 Claims, 7 Drawing Sheets

U.S. PATENT DOCUMENTS

| | | | |
|---|---|---|---|
| 4,393,400 A | 7/1983 | Ikushima et al. | 358/92 |
| 4,431,265 A | 2/1984 | Benton | 350/132 |
| 4,480,263 A | 10/1984 | van Merode | 358/3 |
| 4,517,592 A | 5/1985 | Levy | 358/92 |
| 4,535,354 A | 8/1985 | Rickert | 358/88 |
| 4,541,007 A * | 9/1985 | Nagata | 348/48 |
| 4,557,570 A | 12/1985 | Hines | 354/113 |
| 4,559,556 A | 12/1985 | Wilkins | 358/88 |
| 4,623,219 A | 11/1986 | Trias | 350/351 |
| 4,630,097 A | 12/1986 | Marks | 358/3 |
| 4,641,177 A | 2/1987 | Ganss | 358/3 |
| 4,641,178 A | 2/1987 | Street | 358/3 |
| 4,650,305 A | 3/1987 | Hines | 354/113 |
| 4,658,291 A | 4/1987 | Morishita | 358/92 |
| 4,669,812 A | 6/1987 | Hoebing | 350/3.78 |
| 4,692,792 A | 9/1987 | Street | 358/3 |
| 4,704,627 A | 11/1987 | Yuyama et al. | 358/88 |
| 4,706,134 A | 11/1987 | Jinguji | 358/343 |
| 4,709,213 A | 11/1987 | Podhrasky | 324/329 |
| 4,717,949 A | 1/1988 | Eichenlaub | 358/3 |
| 4,719,482 A | 1/1988 | Hora | 350/91 |
| 4,729,017 A | 3/1988 | Sayanagi et al. | 358/88 |
| 4,734,756 A | 3/1988 | Butterfield et al. | 358/3 |
| 4,740,836 A | 4/1988 | Craig | 358/92 |
| 4,743,964 A | 5/1988 | Allard et al. | 358/88 |
| 4,743,965 A | 5/1988 | Yamada et al. | 358/88 |
| 4,799,103 A | 1/1989 | Muckerheide | 358/88 |
| 4,799,763 A | 1/1989 | Davis et al. | 350/137 |
| 4,829,365 A | 5/1989 | Eichenlaub | 358/3 |
| 4,871,231 A | 10/1989 | Garcia, Jr. | 350/144 |
| 4,872,750 A | 10/1989 | Morishita | 353/7 |
| 4,875,034 A | 10/1989 | Brokenshire | 340/721 |
| 4,905,076 A | 2/1990 | Annegarn et al. | 358/3 |
| 4,943,852 A | 7/1990 | Femano et al. | 358/88 |
| 4,954,890 A | 9/1990 | Park | 358/88 |
| 4,956,705 A * | 9/1990 | Wright | 348/50 |
| 4,957,351 A | 9/1990 | Shioji | 350/348 |
| 4,959,641 A | 9/1990 | Bass et al. | 340/700 |
| 4,963,959 A | 10/1990 | Drewlo | 358/88 |
| 4,994,898 A | 2/1991 | Ling et al. | 358/3 |
| 5,001,555 A | 3/1991 | Park | 358/88 |
| 5,003,385 A | 3/1991 | Sudo | 358/88 |
| 5,036,385 A | 7/1991 | Eichenlaub | 358/3 |
| 5,083,199 A | 1/1992 | Borner | 358/88 |
| 5,098,426 A | 3/1992 | Sklar et al. | 606/5 |
| 5,099,320 A | 3/1992 | Allio | 358/88 |
| 5,151,821 A | 9/1992 | Marks | 359/462 |
| 5,162,897 A | 11/1992 | Jitsukata et al. | 358/3 |
| 5,193,000 A | 3/1993 | Lipton et al. | 358/92 |
| 5,223,925 A | 6/1993 | Hattori | 358/88 |
| 5,260,773 A | 11/1993 | Dischert | 358/3 |
| 5,283,640 A | 2/1994 | Tilton | 348/42 |
| 5,357,277 A | 10/1994 | Nakayoshi et al. | 348/55 |
| 5,430,474 A * | 7/1995 | Hines | 348/42 |
| 5,568,313 A * | 10/1996 | Steenblik et al. | 359/463 |
| 5,602,679 A * | 2/1997 | Dolfogg et al. | 359/640 |
| 5,614,941 A | 3/1997 | Hines | 348/42 |
| 5,745,665 A * | 4/1998 | Pasco | 345/427 |
| 5,751,927 A * | 5/1998 | Wason | 345/419 |
| 5,986,804 A * | 11/1999 | Mashitani et al. | 359/462 |
| 6,005,607 A * | 12/1999 | Uomori et al. | 348/42 |
| 6,023,263 A * | 2/2000 | Wood | 345/139 |
| 6,108,005 A * | 8/2000 | Starks et al. | 345/419 |
| 6,166,792 A * | 12/2000 | Miyawaki et al. | 349/113 |
| 6,327,381 B1 * | 12/2001 | Rogina et al. | 382/154 |
| 6,481,849 B2 * | 11/2002 | Martin et al. | 353/7 |

OTHER PUBLICATIONS

Dogson, Neil A, John R. Moore, and Stewart R. Lange, "Time–multiplexed Autostereoscopic Camera System" Presented at *SPRIE Symposium on Steroscopic Displays and Applications VIII*, San Jose, California, Feb. 11–13, 1977; Published in *Proc. SPIE*, vol. 3012, pp. 72–83.

Tetsutani, Nobuji and Fumio Kishino, "3–Dimensional Display Method without Special Glasses for Virtual Space Teleconferencing System" *SPIE* vol. 1988 Display Systems (1993). pp. 18–25.

Hines, Stephen P., "Autosteroscopic Video Display with Motion Parallax", *SPIE* vol. 3012 (1997), pp. 208–219.

* cited by examiner

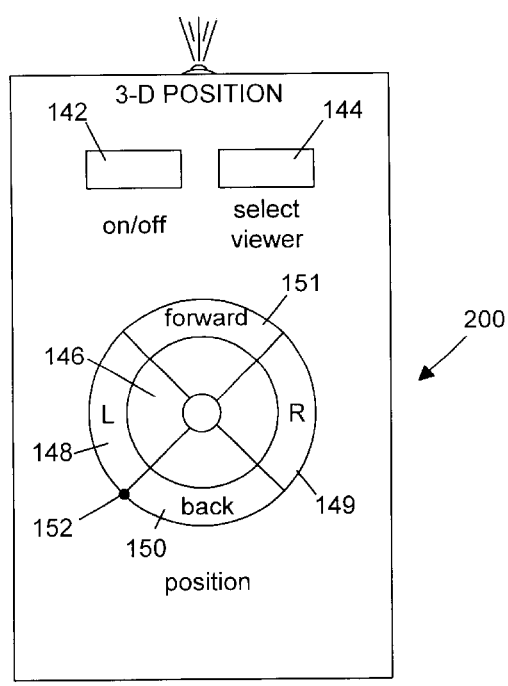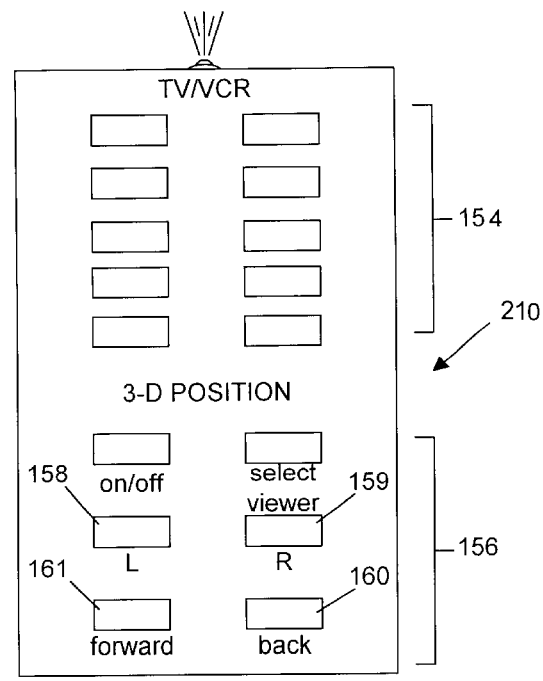
Fig. 11
Fig. 12

THREE-DIMENSIONAL DISPLAY SYSTEM

FIELD OF INVENTION

These inventions relate to three-dimensional (3-D) display systems and methods, and, in particular, to a 3-D display system and method in which 3-D viewing is permitted at multiple viewing positions, such as multiple viewing angles or distances, from the screen.

BACKGROUND OF INVENTION

Creating the illusion of three-dimensional (3-D) images on a 2-D display device or projection screen has been attempted for many years. In the 1950's, 3-D movies were popular with polarized glasses worn to separate images for the left and right eye to provide for a stereoscopic view of the movie. Another area in which 3-D imagery has been attempted is on raster scan displays. Generally, when the term 3-D is used in regard to computer graphics, the term is referring to planar generated 3-D images that are created using geometric perspective and projection transformations and other monocular depth cues such as hidden line removal, surface modeling, shading, texture mapping, and rotation. These techniques are appropriate for computer games and CAD application software but not for viewing camera-generated images such as used by the television industry.

Stereoscopic images present the viewer with slightly different perspectives for the left and right eyes which fuse together to provide a sense of depth, in a process called stereopsis. Stereoscopic displays typically require the use of some device worn by the viewer to separate the left and right eye perspectives. Autostereoscopic displays make use of some device externally attached to the 3-D display to generate the left and right views without the aid of a special viewing aid worn by the viewer. These devices are lenticular screens, light valves, floating displays, or other types of devices.

Autostereoscopic 3-D methods are preferred because of elimination of the need for special glasses to separate the left and right eye images. The lenticular screen has been investigated extensively for use in autostereoscopic displays. The lenticular screen uses vertically oriented stereoscopic image pairs and focuses them at the proper point for viewing. Using a fixed image under the lenticular screen will only allow one viewer to be in focus with the 3-D image.

Prior art patents have presented different methods for generation of 3-D displays. Several prior art displays use the concept of generating vertical stereoscopic image strips projected onto the back of a lenticular screen. See, e.g., U.S. Pat. Nos. 4,541,007; 4,214,257; 5,430,474; 5,614,941; 4,872,750.

It is known that by multiplexing two camera signals and generating stereoscopic images projected to a lenticular screen that a 3-D image is able to be viewed. See e.g., U.S. Pat. No. 4,214,257. However, U.S. Pat. No. 4,214,257 does not provide for more than a single user.

It is also known that if five camera signals are multiplexed and properly placed in horizontal succession behind a lenticular screen, multiple viewing locations are obtained. See e.g., U.S. Pat. No. 4,541,007.

It is also known that 3-D displays are created by floating one image above another using devices such as the LCD. See e.g., U.S. Pat. Nos. 5,430,474 and 5,614,941. U.S. Pat. Nos. 5,430,474 and 5,614,941 disclose different concepts for generation of 3-D displays as they do not generate vertical image strips for presentation to the lenticular screen.

It is further known that the time multiplexing of camera images are used to present 3-D autostereoscopic images to multiple viewers by use of a LCD shutter device. See e.g., Moore, J. R., Dodgson, N. A., Travis, A. R. L., and Lang, S. R. "Time-Multiplexed Color Autostereoscopic Display." Proc. SPIE, Vol. 2653, pp. 10–19, 1996. This research performed at the University of Cambridge discloses the use of a LCD shutter device which is a different method for providing multiple viewing locations.

It is also known that 3-D images projected onto a lenticular screen follow a single user with a sensor attached to the user. The system uses mirrors to horizontally shift and change the size of the image to provide for horizontal and distance changes appropriate for the viewer to maintain sight of the 3-D image. See e.g., Tetsutani, N., Kishino, F. "3-Dimensional Display Method without Special Glasses for Virtual Space Teleconferencing System" Proc. SPIE, Vol. 1988, pp. 18–25, 1993. However, this projection system does not allow the flexibility and accuracy of a software-based system.

Each of the patents and articles discussed above is incorporated herein by reference.

Furthermore, FIGS. 1 to 4 illustrate the workings of a conventional prior art autostereoscopic 3-D system using two cameras A (2) and B (4) and employing a lenticular screen 12. FIG. 1 demonstrates the basic principle of a conventional prior art two camera 3-D autostereoscopic display system 1 incorporating a lenticular screen 12. Cameras A (2) and B (4) generate analog video signals that represent the left and right eye perspective views of the image object 6. These video signals are of any type (NTSC, PAL, SECAM, etc.) that are displayable on raster scan display devices 10. The respective analog video signals 3 and 5 from the cameras A (2) and B (4) are input to the graphics controller 8. The graphics controller 8 digitizes the analog signal so that processing of the signals 3 and 5 is accomplished with a digital signal processor or application specific graphics processor. The graphics processor multiplexes the left and right eye perspective views to create a stereoscopic image for the display with the proper timing. Once the stereoscopic raster image has been created digitally, it is then properly conditioned to form a signal 14 meeting the input requirements of the specific type of display device 10 being used. The lenticular screen 12 focuses the raster scan stereoscopic images to the proper locations for the viewer 16.

FIG. 2 shows conventional prior art views of left and right image strips showing two different perspectives derived from the two cameras A (2) and B (4) of the same image. These views demonstrate how the stereoscopic images appear on the display device 10 as seen in FIG. 1. The left view 20 and right view 18 are shown separately for illustration purposes only. The left view 20 shows the vertical strips of the stereoscopic image, which is generated from camera A (2), and the right view 18 shows the vertical strips of the image from camera B (4). These images represent the position of the image as displayed for one viewing location. For other viewing locations, the same vertical strips are shifted horizontally by small amounts.

To be able to view the stereoscopic image pairs, they must be aligned properly with the lenticular screen 12. The lenticular screen 12 has many individual lenses called lenticules 19. The lenticules 19 are vertically oriented convex lenses attached parallel to each other. For example, the display on display device 10 appears on the lenticular screen 12 as shown in FIG. 3. FIG. 3 shows a view of a stereoscopic image pair that appears on the back of one lenticule 19 in the lenticular screen 12. Each of the lenticules 19 has one vertical strip 32 of the stereoscopic image for the left eye 26 and one strip 34 for the right eye 24. The adjacent lenticules 19 have a strip of the camera views corresponding to the image shifted to the left or right. The position of the image strips 32 and 34 represent one viewing location.

To focus each of the stereoscopic image pairs 32 and 34 to the proper eye 26 and 24, they must be placed in unique locations at the back of the lenticules 19. Referring to FIG. 4, the vertical images are placed at the back of the lenticules 19 to maintain the proper stereoscopic relationship. The left view strips 32 and right view strips 34 placed at the back of the lenticules 19 respectively provide left eye 26 and right eye 24 stereoscopic views which are in focus for the lenticules 19. With all image strips placed in the proper locations at the back of the lenticules 19, the viewer is able to observe a complete stereoscopic 3-D image on the lenticular screen 12.

The problem with the basic operation of the above conventional prior art stereoscopic display system is that it is generally only able to be properly viewed by one viewer at a time at one position. The single viewer system will only have one position directly in front of the lenticular screen 12 in which the stereoscopic images will have the proper focus to the right and left eyes 24 and 26. Therefore, other viewers would, therefore, not be able to see or view the 3-D images on the screen 12.

While the above inventions provide 3-D viewing using fixed lens or screen techniques, none of these approaches permit 3-D viewing without the use of special glasses or aids at multiple viewing positions, such as variable angular positions in front of the screen or at variable distances from the screen. All of the above-described approaches use a fixed display pattern behind a viewing lens to achieve the 3-D effect. None of these approaches take full advantage of modern video signal processing technology to present variable picture structures behind or at the back of a lenticular screen to achieve 3-D viewing from multiple, variable positions in front of the screen. Furthermore, none of the approaches described in the above references permit dynamic changing of the video presentation by a user with remote control to alter the viewing angle and distance to suit the comfort of the viewer. None of the above-described approaches oscillate a single image behind a lenticular screen to achieve multiple viewing locations.

SUMMARY OF THE INVENTION

The proposed invention generates 3-D autostereoscopic images on a raster scan display device. The system uses two cameras placed in stereoscopic relation to the object being viewed. The analog video signals from the two cameras are input to a graphics controller where they are digitized. These digital signals are processed to generate output video signals that are vertical image strips for the left and right eyes. These video signals are input to the display device. The display device is covered with a lenticular screen, that has a number of vertical lenticules wherein the stereoscopic image pairs are generated by the graphics processor for each vertical lenticule. The lenticule is a convex semi-cylindrical lens that focuses the stereoscopic image pairs to the left and right eyes.

In addition to producing the vertical image strips, the graphics controller oscillates the image strips horizontally by small amounts. This oscillation of the image strips causes a horizontal shift in the focal point of the image (i.e. new viewing position in a horizontal direction). The graphics processor produces multiple viewing locations by the rapid horizontal oscillation of the image strips to different locations.

The graphics processor also changes the width of the stereoscopic image strips being generated for the display device. This change in width alters the distance from the display at which the 3-D image is viewed. Variable width and horizontal oscillation of the image strips provides for the possibility of 3-D images being viewed from multiple, variable angular positions at different distances from the screen.

The proposed 3-D system also has the capability for individual viewer input to control the specific viewing location. Adjustable viewing locations are accomplished with the use of a remote control device. This remote control device allows an individual viewer to move from one location to another and adjust the 3-D image to be in focus at the new location. The inputs from the remote control are viewer number, change of horizontal location, and change of distance. The changing of location inputs is accomplished either with buttons (one set for horizontal shift and one set for distance shift), a joystick type input device, or the like.

It is therefore a principal object of this invention to provide a new and improved three dimensional (3-D) viewing system and method.

It is another object of this invention to provide a three dimensional (3-D) viewing system and method that provides multiple viewing positions for one or more viewers.

It is a further object to provide a 3-D viewing system and method using lenticular lens technology to provide 3-D images by focusing video images produced from multiple cameras and processed with high speed video processor technology to generate interleaved video images behind the lenticular screen.

It is a further object of this invention to provide multiple, adjustable viewing angles in front of the screen.

It is yet another object of this invention to provide 3-D image viewing at multiple, adjustable distances from the screen.

It is still another object of this invention to enable viewers to adjust the viewing position in front of the screen via a remote control device.

It is yet another object to achieve variable and multiple angular and distance viewing locations in front of the viewing screen by oscillating interleaved image strips and varying the width of these strips behind a lenticular viewing screen.

Further objects of the invention are apparent from reviewing the summary of the invention, detailed descriptions, and claims set forth below.

The above objects and advantages of the invention are achieved by a system for generating and displaying three-dimensional images of a scene on a screen that provides multiple viewing positions for one or more viewers. A stereoscopic video capture system picks up video images of the scene. A video signal processing unit processes the video images into video signals. The video signal processing unit has a graphics controller for controlling and processing the video signals into stereoscopic display signals. A display unit displays the stereoscopic display signals as stereoscopic display images on the screen, and the graphics controller manipulates the stereoscopic display images to provide multiple viewing positions of the stereoscopic display signals on the display unit of the screen to the one or more viewers. Multiple viewing angles and distances are provided for the one or more viewers. The stereoscopic display images are oscillated to provide multiple viewing angles. The stereoscopic display images comprise vertical image pair strips and dark vertical strips interposed between the vertical image pair strips. These strips are alternately interchanged in position for oscillating the stereoscopic display images, typically above a critical fusion frequency for human vision, to provide multiple viewing angles. The vertical image pair strips are varied in width to provide multiple viewing distances. A control unit, such as a remote unit or attached unit, is used for adjusting and updating the multiple viewing positions, such as multiple viewing angles or distances, of the stereoscopic display images on the screen for the one or more viewers.

The stereoscopic video capture system includes a first video camera arranged to capture the video images of the scene corresponding to a left stereoscopic image view of the scene and a second video camera arranged to capture the video images of the scene corresponding to a right stereoscopic image view of the scene. The video signal processing unit has an analog-to-digital converter for converting the video images from the stereoscopic video capture system to a digital signal and a graphics digital signal processor for processing the digital signal from the analog-to-digital converter to generate the stereoscopic image signals. The graphics digital signal processor processes the digital signal from the analog-to-digital converter and generates the stereoscopic display signals that are displayed on the screen as the stereoscopic display images. The stereoscopic display signals generated by the graphics digital signal processor comprises alternating, interleaved vertical strips of the video images of the scene to produce the three-dimensional images to the one or more viewers located at a particular viewing position in front of the screen. Positions of the vertical strips produced by the graphics digital signal processor are adjusted by the one or more viewers to optimize viewing effect of the three-dimensional images at different angular positions in front of the screen. The display unit further includes a display medium for displaying the video signals and a lenticular screen superimposed between the display medium and the one or more viewers to focus the stereoscopic display images on the screen.

The above objects and advantages of the invention are further achieved by a method of making a system for generating and displaying three-dimensional images of a scene on a screen providing multiple viewing positions for one or more viewers. A stereoscopic video capture system is provided for picking up video images of the scene. A video signal processing unit is provided for processing the video images into video signals wherein the video signal processing unit has a graphics controller for controlling and processing the video signals into stereoscopic display signals. A display unit is provided for displaying the stereoscopic display signals as stereoscopic display images on the screen, and the graphics controller is used to manipulate the stereoscopic display images to provide multiple viewing positions of the stereoscopic display signals on the display unit of the screen to the one or more viewers.

The above objects and advantages of the invention are also achieved by a method of generating and displaying three-dimensional images of a scene on a screen providing multiple viewing positions for one or more viewers. Video images of the scene are picked up by use of a stereoscopic video capture system. The video images are processed into video signals by use of a video signal processing unit. The video signals are controlled and processed into stereoscopic display signals by use of a graphics controller. The stereoscopic display signals are displayed as stereoscopic display images on the screen, and the stereoscopic display images are manipulated by use of the graphics controller to provide multiple viewing positions of the stereoscopic display signals on the screen to the one or more viewers. The stereoscopic display images are manipulated to provide multiple viewing angles or multiple viewing distances for the one or more viewers.

The preferred embodiments of the inventions are described below in the Figures and Detailed Description. Unless specifically noted, it is intended that the words and phrases in the specification and claims be given the ordinary and accustomed meaning to those of ordinary skill in the applicable art or arts. If any other meaning is intended, the specification will specifically state that a special meaning is being applied to a word or phrase. Likewise, the use of the words "function" or "means" in the Detailed Description is not intended to indicate a desire to invoke the special provisions of 35 U.S.C. Section 112, paragraph 6 to define the invention. To the contrary, if the provisions of 35 U.S.C. Section 112, paragraph 6, are sought to be invoked to define the inventions, the claims will specifically state the phrases "means for" or "step for" and a function, without also reciting in such phrases any structure, material, or act in support of the function. Even when the claims recite a "means for" or "step for" performing a function, if they also recite any structure, material or acts in support of that means of step, then the intention is not to invoke the provisions of 35 U.S.C. Section 112, paragraph 6. Moreover, even if the provisions of 35 U.S.C. Section 112, paragraph 6, are invoked to define the inventions, it is intended that the inventions not be limited only to the specific structure, material or acts that are described in the preferred embodiments, but in addition, include any and all structures, materials or acts that perform the claimed function, along with any and all known or later-developed equivalent structures, materials or acts for performing the claimed function.

For example, there is disclosed a graphics processor that produces the video signals, processed from the analog camera signals, which are input to the display device. The specific form of the graphics processor is not important to the invention. Processing of the video signals can be implemented using single or multiple microprocessors, digital signal processors, or special purpose graphics processors. Thus, it is not the applicant's intention to limit his invention to any particular form of graphics processor.

Further examples exist throughout the disclosure, and it is not the applicant's intention to exclude from the scope of his invention the use of structures, materials, or acts that are not expressly identified in the specification, but nonetheless are capable of performing a claimed function.

BRIEF DESCRIPTION OF THE DRAWINGS

The inventions of this application are better understood in conjunction with the following drawings and detailed descriptions of the preferred embodiments. The various hardware and software elements used to carry out the invention are illustrated in the attached drawings in the form of block diagrams, flow charts, and other illustrations.

FIG. 11 is a top view of an infra-red remote unit designed for the present 3-D viewing system.

FIG. 12 is a top view of a combined infra-red TV/VCR and 3-D viewing control unit designed for the present 3-D viewing system.

DETAILED DESCRIPTION

The above prior art discussion referencing FIGS. 1 to 4 presented the basic operation of a stereoscopic display system, which is generally only able to be properly viewed by one viewer at one position. As seen in these figures, the single viewer system will only have one position directly in front of the lenticular screen 12 in which the stereoscopic images will have the proper focus to the right and left eyes 24 and 26.

Figure 1:
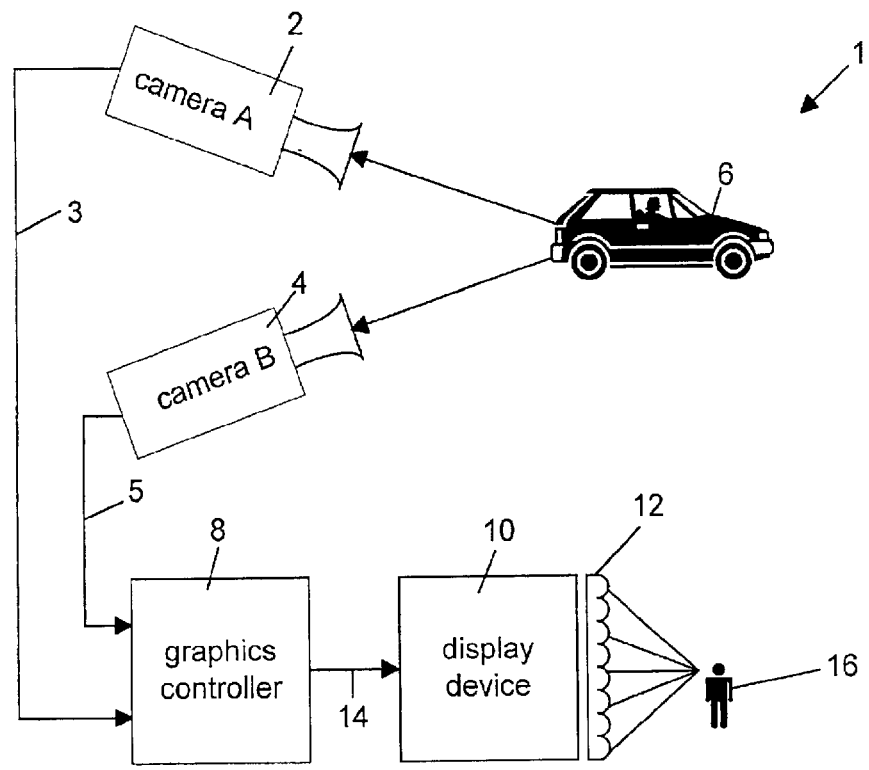
FIG. 1 is an overall diagram of a conventional prior art autostereoscopic 3-D system using only two cameras and employing a lenticular screen.
Figure 2:
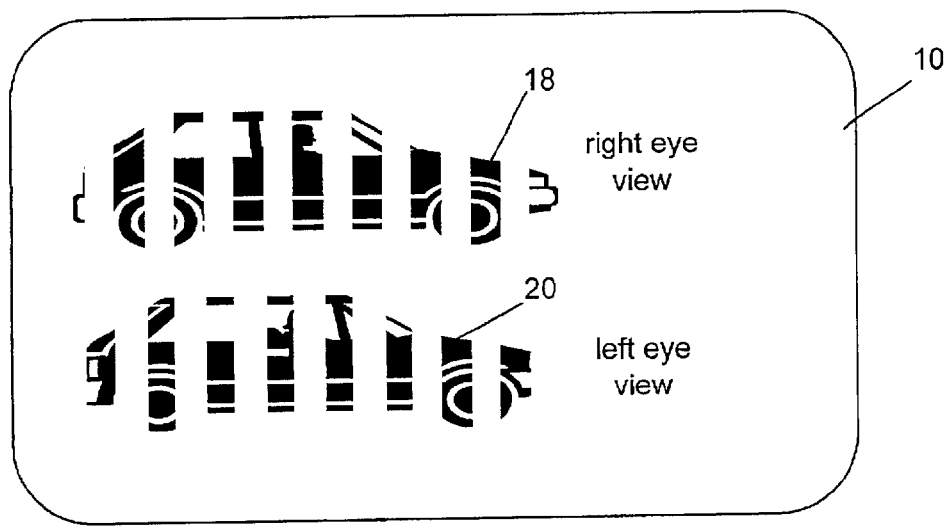
FIG. 2 are conventional prior art views of left and right image strips showing two different perspectives derived from the two cameras of the same image.
Figure 3:
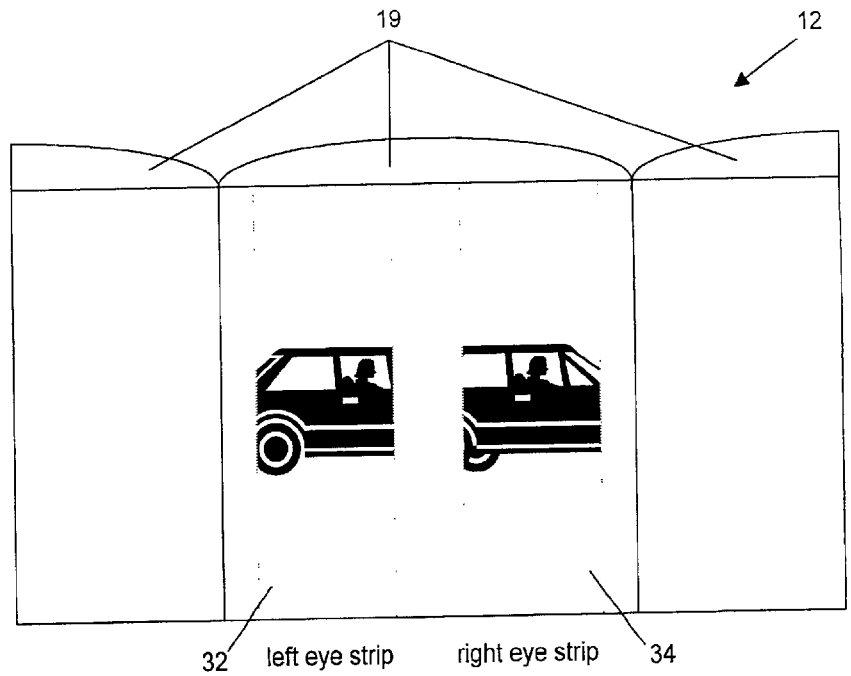
FIG. 3 is a conventional prior art view of a stereoscopic image pair that appears on the back of one lenticule in the lenticular screen.
Figure 4:
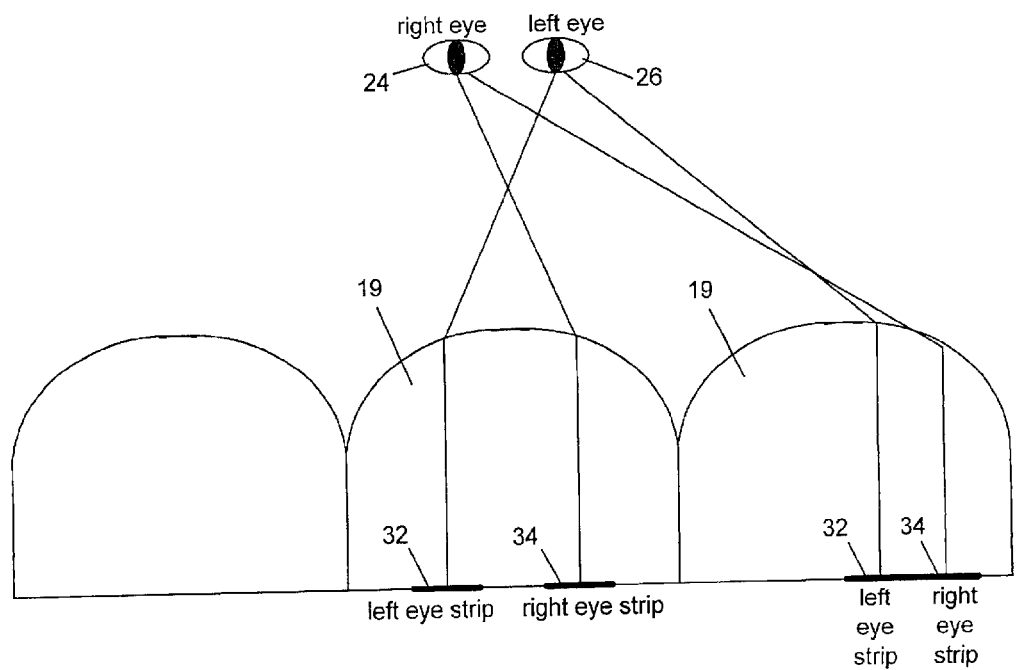
FIG. 4 is a conventional prior art top view of the lenticular screen focusing the right and left camera images to the proper eye only allowing one viewer to view the resulting 3-D image at the center of the screen.
Figure 5:
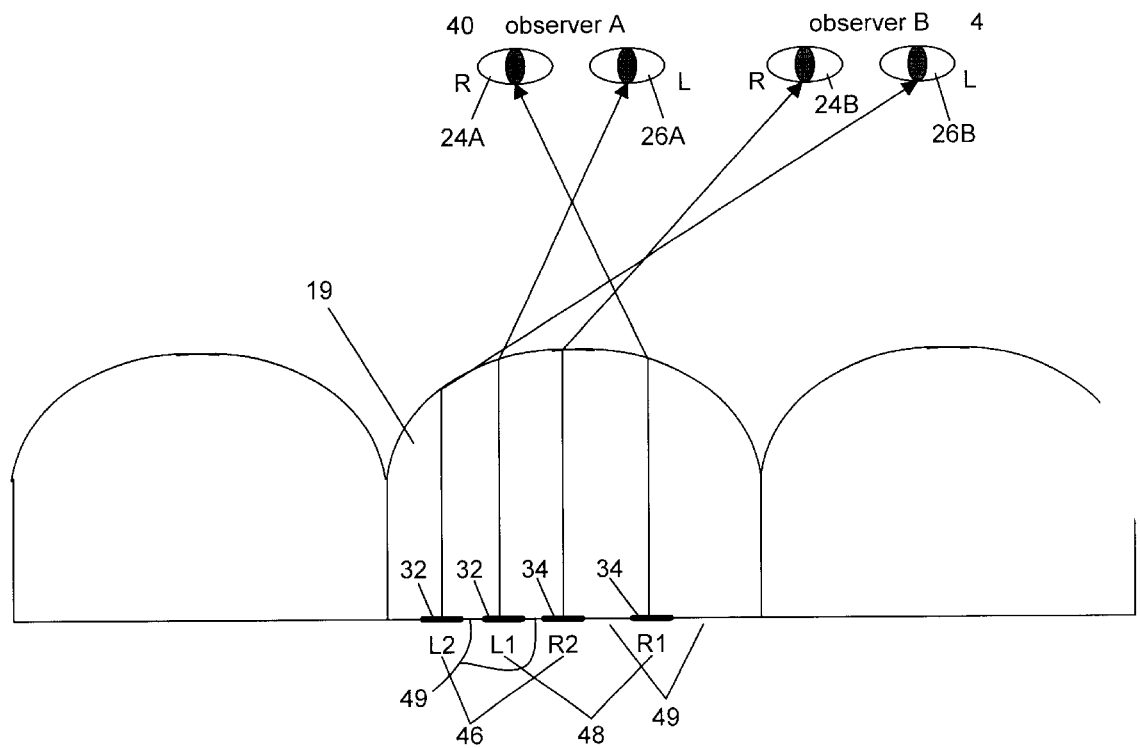
FIG. 5 is a top view of the same left and right camera images of FIG. 4 except that the images are alternately displayed at various locations allowing multiple viewers to view the resulting 3-D image at various locations along a horizontal plane.

FIGS. 5 to 12 show the present invention apparatus and methods that provide multiple viewing locations. The graphics controller 8 of FIG. 1 is programmed to create new viewing locations by oscillating the image pairs horizontally to the left or right of the original position by a small amount to cause the image to be focused at a new point. In FIG. 5, the process for shifting the image pair 32 and 34 that is at the back of one lenticule 19 is illustrated for two possible viewing locations. The graphics controller 8 produces image pair 32 and 34 that are situated at location 48 (i.e. L1, R1) under lenticule 19, which is predetermined to be in focus to the first observing location 40 of observer A. When the stereoscopic strips of the image pair 32 and 34 are shifted to location 46 (i.e. L2, R2), they will now be in focus to a second observer B who is observing the screen 12 from location 42. Dark vertical strips 49 are interposed between successive pairs of right and left video strips. These dark strips 49 are arranged to be in focus at alternate viewing angles. The dark strips 49 and the stereoscopic image pair 32 and 34 are interchanged during the oscillation of the video image signal. A horizontal shift of the image behind the lenticular screen 12 imposes a proportional shift in the horizontal viewing location. The image pair 32 and 34 is oscillated between the two locations at a rate above the critical flicker fusion frequency (CFF) so that the image appears to be continuous to each of the viewers or observers 40 or 42. Oscillating the image strip pair 32 and 34 to other positions at the back of the lenticules 19 provides for multiple viewable locations.

Figure 6:
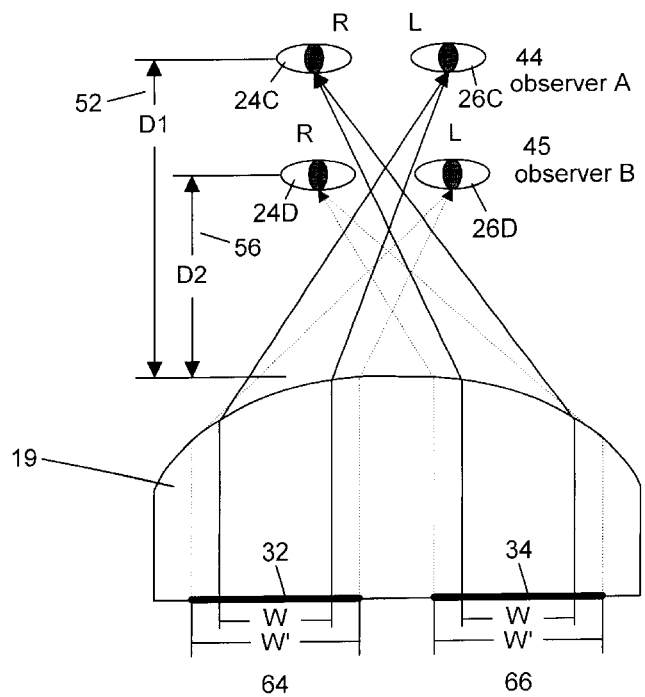
FIG. 6 is a top view of a lenticule of the lenticular screen showing the change of the viewable distance from the display by changing the width of the stereoscopic strips.

Additional flexibility in viewing locations is accomplished through control of the viewing distance from the screen 12. This flexibility is accomplished by adjustment of the width of the strereoscopic image strips 32 and 34. In FIG. 6, the image strips 32 and 34 behind lenticule 19, which are each of width W, are viewable to observer A (44). The viewing distance from the lenticular screen 12 for this image width W is distance D1 (52). If the widths of the image strips 32 and 34 are each increased to W', then the stereoscopic image is properly viewed by observer B (45) at a distance D2 (56) from the lenticular screen 12. The image strips 32 and 34 are adjusted or made to any width constrained only by the design of the lenticular screen 12.

With control over horizontal or angular position and distance of the viewable locations as defined in FIGS. 5 and 6, the graphics controller 8 creates viewing locations over a wide area. The overall system 1 with these above referenced features provides predefined viewing locations in a look up table. Alternatively, an enhanced embodiment of the present invention provides an external input from the viewers or observers 40, 42, 44, or 45. The input device is in the form of an infrared remote control 200 or 210 as shown in FIGS. 11 and 12, or the like, with push button controls or combination of buttons and a positioning joystick, or similar positioning control mechanism.

Figure 7:
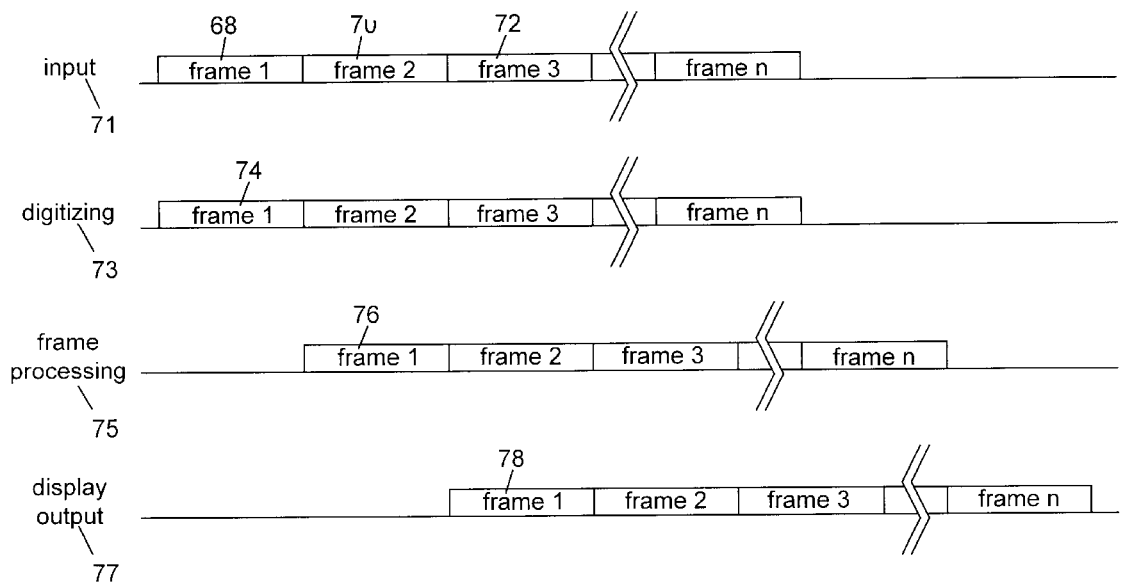
FIG. 7 is a timing diagram showing the timing associated with the processing and multiplexing of the analog video input from the stereoscopic cameras.

The graphics controller 8 of FIG. 1 processes the incoming analog camera signals to generate the stereoscopic image pair strips 32 and 34 necessary for the 3-D image on the display device 10. FIG. 7 shows the frame lag associated with the time required for processing the camera signals. The cameras A (2) and B (4) in FIG. 1 produce analog video frames 68, 70, and 72 as shown in FIG. 7. The analog video signals 3 and 5 for the respective left and right perspectives are converted to digital format for processing into stereoscopic image pairs 32 and 34. The analog to digital (A/D) section of the graphics controller 8 digitizes the camera outputs 3 and 5 as they are generated. This process is evident in FIG. 7 in that the digitizing process 73 of frame 1 (74) occurs simultaneously with the input process 71 of frame 1 (68) from analog video signals 3 and 5. The graphics processor of the graphics controller 8 begins the frame processing process 75 of the digital signals once the frame has been completely digitized. Processing of frame 1 (76) is seen in FIG. 7 to exhibit a one-frame lag from the digitizing process 73 of frame 1 (74). The frame processing process 75 must be completed before sending the stereoscopic image pair 32 and 34 video information to the display device 10. The timing diagram of FIG. 7 also shows that the frame 1 (78) at the display output 77 has a one-frame time lag from the frame 1 (76) of the frame processing process 75.

Figure 8:
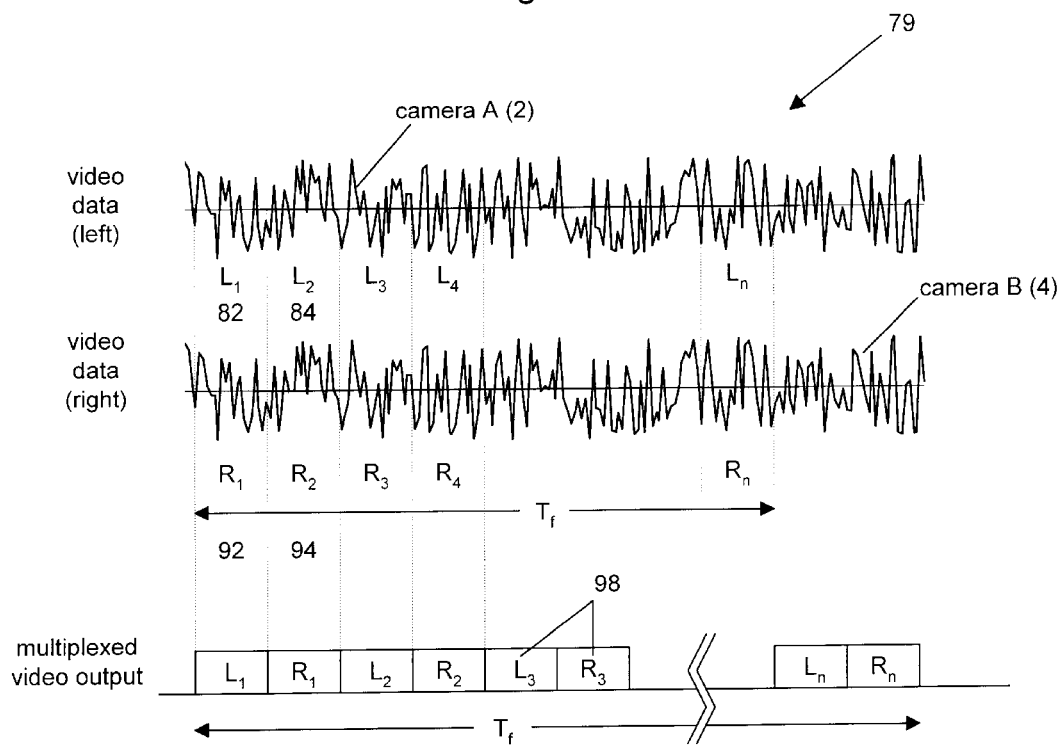
FIG. 8 is a plot diagram of the timing involved with time multiplexing of the two camera signals into one digital data stream.

FIG. 8 illustrates a timing plot diagram of the timing involved with time multiplexing of the two camera signals 3 and 5 into one digital data stream. The processing of the frames for these signals 3 and 5 are shown in FIG. 8. The analog signal from camera A (2) is separated into various segments (82, 84 etc.) which are used to generate the L vertical strips (i.e. L1, L2, L3,", Ln) of the stereoscopic left view for left eye 26. The same is done with the right view camera B (4) wherein the analog signal is separated into various segments (92, 94 etc.) which are used to generate the R vertical strips (i.e. R1, R2, R3, R4,"., Rn) of the stereoscopic right view for right eye 24. The individual pieces of left and right image video signals 3 and 5 are multiplexed into a single data stream 98. The process is complete for one frame when the video information for the last lenticule 19 is placed in the multiplexed digital video data stream 98. The multiplexed signal is transmitted in the same time frame $T_f$ for each of the video signals 3 and 5, except that the multiplexed signal requires twice the bandwidth as compared with the video segments of the video signals 3 and 5. This process is repeated for the desired number of viewing locations, as the video stream will vary depending on where the vertical strips 32 and 34 need to be placed on the display screen 12 for the individual viewers or observers 40, 42, 44, or 45.

Figure 9:
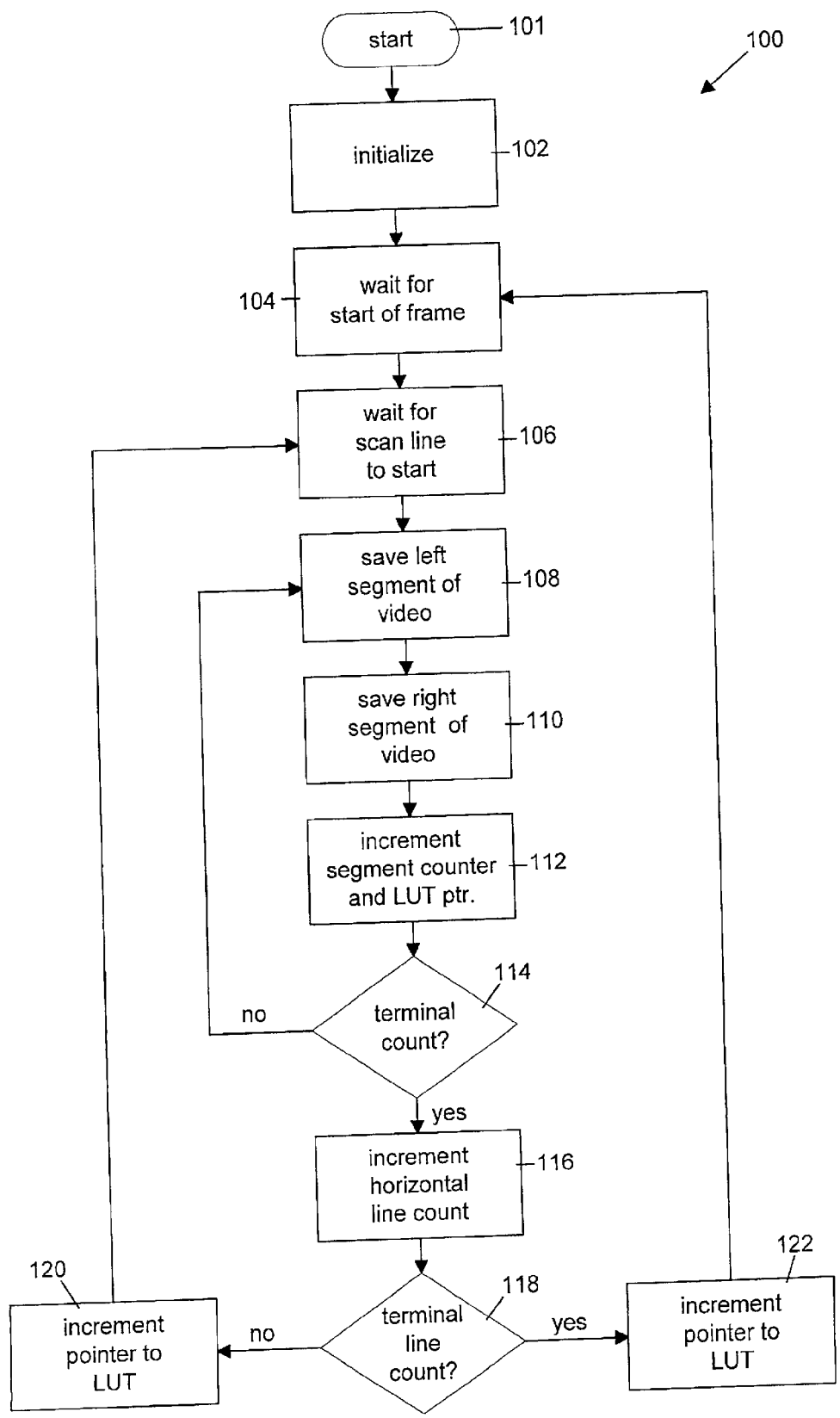
FIG. 9 is a flow chart diagram of the graphics controller operation.

A flow chart for the processing phase algorithm 100 of the stereoscopic image generation process is seen in FIG. 9. The process 100 starts at block 101. After the algorithm 100 is initiated and executed, the registers and pointers for the digital information memory are initialized to the proper values at block 102. Since the algorithm 100 starts at some random point in the frame, the algorithm 100 must wait until it detects the start of frame at block 104. The algorithm 100 waits for the time involved with the horizontal retrace time to maintain synchronization with the digitization process at block 106. The algorithm 100 begins saving the data for the segments of the video signal representing the vertical strips 32 and 34 of stereoscopic image pairs at blocks 108 and 110. To be able to generate the output video signals properly, the graphics processor of the graphics controller 8 must either calculate the horizontal position of the next piece of input video or find the necessary information stored in memory in a look up table (LUT). The LUT is a faster method of update, but the calculation method is more flexible. The description of FIG. 9 is of the LUT method but is easily modified to make use of the calculation method. The algorithm 100 increments the counter for scan line length and the pointer to the LUT at block 112. The processor determines whether the analog video signal is at the end of a scan line at block 114. If the analog video signal is not at the end of a scan line, then it will continue to correspondingly and respectively process the scan line at blocks 108, 110, and 112. When the analog video signal is at the end of a scan line, the algorithm 100 increments the horizontal line counter at block 116. The processor then checks to see whether the frame is complete and all scan lines have been processed at block 118. If the frame has not been completed in processing, the algorithm 100 will update the pointer to the LUT at block 120, return to block 106, and continue the process until all the scan lines have been processed. If all scan lines have not been processed, then the algorithm 100 increments the LUT pointer at block 122 and the algorithm 100 loops back to wait for the start of a next frame at block 104. The frame processing phase of algorithm 100 then begins again for the next viewable location of the complete 3-D image on screen 12.

Figure 10:
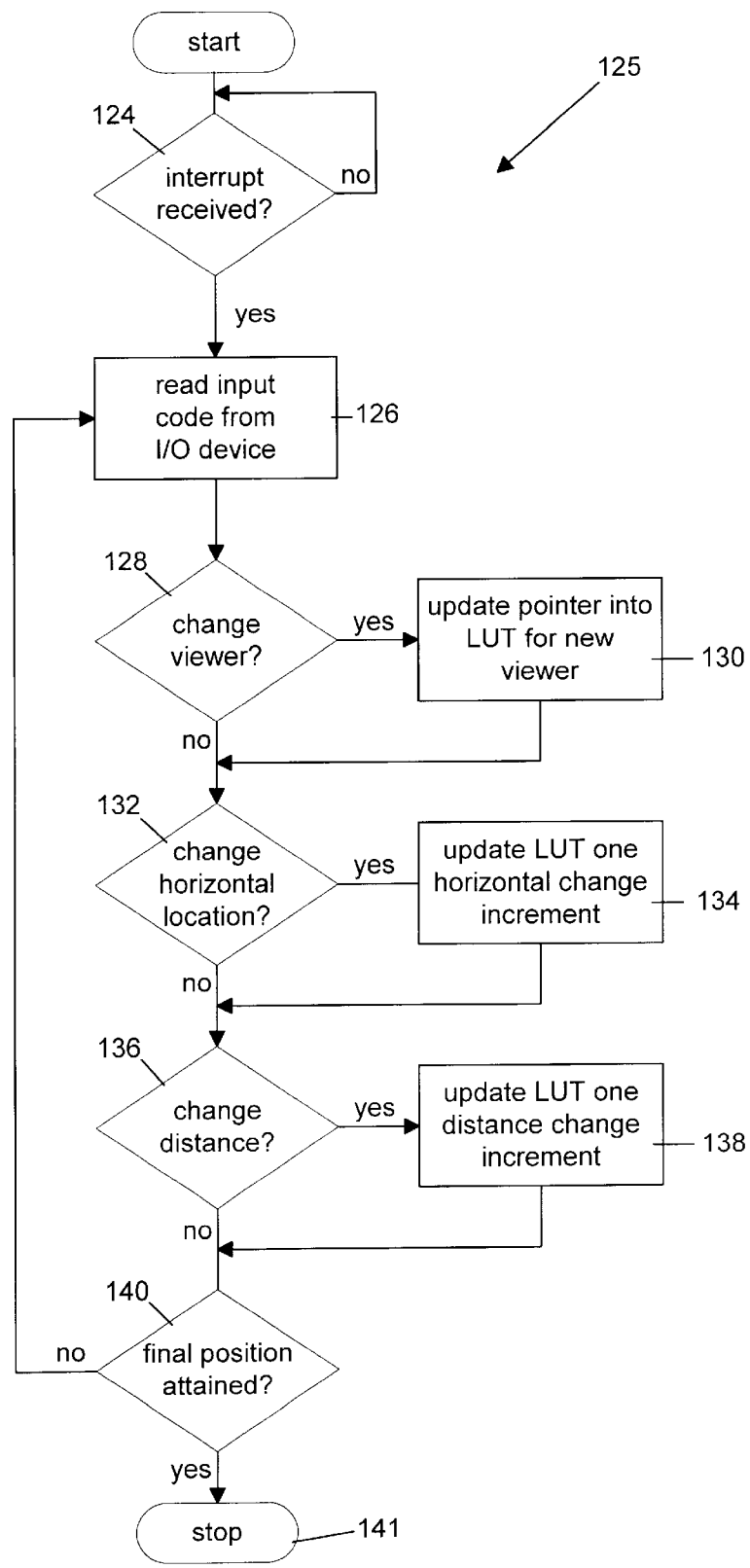
FIG. 10 is a flow chart diagram of the interrupt service routine (ISR) processing.

To handle the asynchronous input from a remote control unit, an interrupt service routine (ISR) 125 is used. In FIG. 10, the ISR 125 waits for the interrupt at block 124. When the viewer has activated one of the remote control functions at block 126, the ISR 125 begins processing by executing the code relating to that function. The processor first identifies whether the action is from a new viewer or from the same viewer as the last to use the remote unit at block 128. The current viewer, if a new viewer, must be known in order to update the proper location in the LUT at block 130. The remote unit provides two types of positional update information: horizontal update information and distance update information. With a positioning device such as a joystick, both horizontal and distance information are provided simultaneously. In a push button type of control, the information is entered separately by hitting the appropriate key for horizontal or distance update. The ISR 125 must check to determine whether it must update the horizontal position at block 132 and update the LUT for appropriate shift of the stereoscopic image pairs at block 134. The ISR 125 checks to see whether the distance to the screen 12 must also be updated at block 136. If so, the LUT is updated for the necessary distance information at block 138. The updating of the horizontal and distance input happens in increments to give the user the opportunity to release the positioning control before overshooting the desired 3-D image. The ISR 125 determines if the image has been readjusted to the point where no additional input at block 140 is required. If not, horizontal and distance updating continues at block 126. If the final position has been attained, then the ISR 125 ends at block 141. The ISR 125 starts over again for additional input from the remote unit and waits for the next interrupt at block 124.

The remote control unit permits individual adjustment of the viewing location of the 3-D image on screen 12 by the user. Two embodiments of the remote unit are shown in FIGS. 11 and 12. FIG. 11 shows an infra-red remote unit 200 designed specifically for the present 3-D viewing system. The on/off button 142 enables or disables the viewer locating subsystem. Button 144 selects the particular view to be adjusted to a new location. The omni-directional control 146 moves the viewing location in the direction selected. For example, if the L (left) portion 148 of the position control 146 is depressed, then the viewing location is shifted to the left. If the R (right) portion 149 of the position control 146 is depressed, then the viewing location is shifted to the right. If the back portion 150 of the position control 146 is depressed, then the viewing location shifts to the back. If the forward portion 151 of the position control 146 is depressed, then the viewing location shifts forwards. When both the L (left) portion 148 and back portion 150 are simultaneously selected by depressing location 152 of the position control 146, then the viewing location will move both left and back at the same time.

FIG. 12 is an example of a combined remote unit 210 having the present 3-D remote unit 156 incorporated with a standard TV/VCR infra-red remote control unit 154. Section 154 of the remote has standard TV/VCR controls including channel, volume, start/stop, fast forward, etc. Section 156 is the 3-D viewing control section of the remote control unit 210 incorporating the same operations as defined by the remote unit 200 of FIG. 11. However, the 3-D remote control unit section 156 of remote unit 210 uses discrete buttons 158 and 159 for left and right position controls and discrete buttons 161 and 160 for the forwards and back position controls.

The inventions set forth above are subject to many modifications and changes without departing from the spirit, scope or essential characteristics thereof. Thus, the embodiments explained above should be considered in all respect as being illustrative rather than restrictive of the scope of the inventions as defined in the appended claims. For example, the present invention is not limited to the specific embodiments, apparatuses and methods disclosed for alternately displaying images at various locations to allow multiple viewers to view the resulting 3-D image at various locations along a horizontal plane. Furthermore, the present invention is not limited to be specifically used with a lenticular screen, and any suitable screen or display device may be used with the present invention. Also, the timing and time multiplexing for processing the frames and images are not limited to those disclosed in the present application, and any suitable timing or time multiplexing processes may be used with the present invention. Additionally, the present invention is not limited to the processes for time multiplexing of two camera signals into one data stream, and any suitable processes for processing two camera signals into one data stream may be used with the present intention. Furthermore, the present invention discloses algorithms for the graphics controller operation and the interrupt service routine, and the present invention are not limited to being used with only these specific algorithms. Also, the present invention discloses specific units for controlling the 3-D viewing position for each of the viewers, and any suitable control units may be used for controlling such 3-D viewing position operations.

We claim:

1. A system for generating and displaying three-dimensional images of a scene on a screen providing multiple viewing positions for least one viewer, the system comprising:
    (a) a video signal processing unit for processing video images into video signals wherein the video signal processing unit has a graphics controller for controlling and processing the video signals into stereoscopic display signals; and
    (b) a display unit for displaying the stereoscopic display signals as stereoscopic display images on the screen;
    (c) wherein the graphics controller manipulates the stereoscopic display images to provide multiple viewing positions of the stereoscopic display signals on the display unit of the screen to the at least one viewer; and
    (d) the graphics controller is controlled to adjust the stereoscopic display images to provide multiple viewing distances of the at least one viewer from the screen.

2. The system of claim 1 wherein the multiple viewing positions provided by the graphics controller are multiple viewing angles for the at least one viewer.

3. The system of claim 2 wherein the graphics controller oscillates the stereoscopic display images in a horizontal direction to provide the multiple viewing angles.

4. The system of claim 3 wherein the stereoscopic display images further comprises:
    (a) vertical image pair strips; and
    (b) dark vertical strips interposed between the vertical image pair strips;
    (c) wherein the vertical image pair strips and the dark vertical strips are alternately interchanged in position for oscillating the stereoscopic display images.

5. The system of claim 3 wherein the stereoscopic display images oscillate above a critical fusion frequency for human vision.

6. The system of claim 1 wherein the stereoscopic display images further comprise:
    (a) vertical image pair strips; and
    (b) dark vertical strips interposed between the vertical image pair strips;
    (c) wherein widths of the vertical image pair strips are varied to adjust the stereoscopic display images to provide the multiple viewing distances of the at least one viewer from the screen.

7. The system of claim 1 wherein the stereoscopic video capture system further comprises:
    (a) a first video camera arranged to capture the video images of the scene corresponding to a left stereoscopic image view of the scene; and
    (b) a second video camera arranged to capture the video images of the scene corresponding to a right stereoscopic image view of the scene.

8. The system of claim 1 wherein the video signal processing unit further comprises:
    (a) an analog-to-digital converter for converting the video images from the stereoscopic video capture system to a digital signal; and
    (b) a graphics digital signal processor for processing the digital signal from the analog-to-digital converter to generate the stereoscopic image signals.

9. The system of claim 8 wherein the graphics digital signal processor processes the digital signal from the analog-to-digital converter and generates the stereoscopic display signals that are displayed on the screen as the stereoscopic display images.

10. The system of claim 9 wherein the stereoscopic display signals generated by the graphics digital signal processor comprises alternating, interleaved vertical strips of the video images of the scene to produce the three-dimensional images to the at least one viewer located at a particular viewing position in front of the screen.

11. The system of claim 10 wherein positions of the vertical strips produced by the graphics digital signal processor is adjusted by the at least one viewer to optimize viewing effect of the three-dimensional images at different angular positions in front of the screen.

12. The system of claim 1 wherein the display unit further comprises:
    (a) a display medium for displaying the video signals; and
    (b) a lenticular screen superimposed between the display medium and the at least one viewer to focus the stereoscopic display images on the screen.

13. The system of claim 1 further comprising a stereoscopic video capture system for picking up the video images of the scene.

14. A system for generating and displaying three-dimensional images of a scene on a screen providing multiple viewing positions for least one viewer, the system comprising:
    (a) a video signal processing unit for processing video images into video signals wherein the video signal processing unit has a graphics controller for controlling and processing the video signals into stereoscopic display signals;
    (b) a display unit for displaying the stereoscopic display signals as stereoscopic display images on the screen; and
    (c) a control unit for adjusting the multiple viewing positions of the stereoscopic display images on the screen for the at least one viewer.

15. The system of claim 14 wherein the control unit is a remote control unit.

16. The system of claim 15 wherein the control unit is attached to the display unit.

17. The system of claim 15 wherein the control unit controls and updates viewing angle of the at least one user.

18. The system of claim 15 wherein the control unit controls and updates viewing distance of the at least one user.

19. A method of making a system for generating and displaying three-dimensional images of a scene on a screen providing multiple viewing positions for at least one viewer comprising:
    (a) providing a video signal processing unit for processing the video images into video signals wherein the video signal processing unit has a graphics controller for controlling and processing the video signals into stereoscopic display signals;

(b) providing a display unit for displaying the stereoscopic display signals as stereoscopic display images on the screen;

(c) using the graphics controller to manipulate the stereoscopic display images to provide multiple viewing positions of the stereoscopic display signals on the display unit of the screen to the least one viewer; and (d) rising the graphics controller to adjust the stereoscopic display images to provide multiple viewing distances of the at least one viewer from the screen.

20. The method of claim 19 further comprising providing a stereoscopic video capture system for picking up video images of the scene.

21. A method of generating and displaying three-dimensional images of a scene on a screen providing multiple viewing positions for least one viewer, comprising:

(a) processing video images into signals by use of a video signal processing unit and controlling and processing the video signals by use of a graphics controller into stereoscopic display signals;

(b) displaying the stereoscopic display signals as stereoscopic display images on the screen;

(c) manipulating the stereoscopic display images by use of a graphics controller to provide multiple viewing positions of the stereoscopic display signals on the screen to the least one viewer; and (d) adjusting the stereoscopic display images to provide multiple viewing distances of the at least one viewer from the screen.

22. The method of claim 21 wherein manipulating further comprises manipulating the stereoscopic display images to provide multiple viewing angles for the at least one viewer.

23. The method of claim 22 wherein manipulating further comprises oscillating the stereoscopic display images in a horizontal direction to provide the multiple viewing angles.

24. The method of claim 23 wherein oscillating further comprises oscillating the stereoscopic display images in a horizontal direction above a critical fusion frequency for human vision.

25. The method of claim 22 wherein manipulating further comprises:

(a) providing vertical image pair strips and dark vertical strips interposed between the vertical image pair strips, and (b) alternately interchanging the vertical image pair strips and the dark vertical strips in position for oscillating the stereoscopic display images.

26. The method of claim 21 wherein manipulating further comprises manipulating the stereoscopic display images to provide multiple viewing distances of the at least one viewer from the screen.

27. The method of claim 26 wherein manipulating further comprises:

(a) providing vertical image pair strips and dark vertical strips interposed between the vertical image pair strips, and (b) varying widths of the vertical image pair strips to adjust the stereoscopic display images to provide the multiple viewing distances of the at least one viewer from the screen.

28. The method of claim 21 further comprising using a control unit for adjusting the multiple viewing positions of the stereoscopic display images on the screen for the at least one viewer.

29. The method of claim 21 further comprising picking up video images of the scene by use of a stereoscopic video capture system.

30. A system for generating and displaying three-dimensional images of a scene providing multiple viewing positions for at least one viewer, the system comprising:

(a) means for picking up video images of the scene by use of a stereoscopic video capture system;

(b) means for processing the video images into video signals and controlling and processing the video signals into stereoscopic display signals;

(c) means for displaying the stereoscopic display signals as stereoscopic display images; and (d) means for manipulating the stereoscopic display images to provide multiple viewing distances of the at least one viewer from the screen based on individual viewer input.

* * * * *

UNITED STATES PATENT AND TRADEMARK OFFICE
CERTIFICATE OF CORRECTION

PATENT NO. : 6,816,158 B1
DATED : November 9, 2004
INVENTOR(S) : Jerome H. Lemelson et al.

It is certified that error appears in the above-identified patent and that said Letters Patent is hereby corrected as shown below:

Column 13,
Line 11, change "rising" to -- using --.
Line 20, after "into" insert -- video --.

Signed and Sealed this

Twenty-second Day of March, 2005

JON W. DUDAS
*Director of the United States Patent and Trademark Office*